US006346779B1

(12) United States Patent
Aiello (10) Patent No.: US 6,346,779 B1
(45) Date of Patent: Feb. 12, 2002

(54) VARIABLE FREQUENCY SELF-OSCILLATING HALF-BRIDGE DRIVE ARCHITECTURE PARTICULARLY FOR ELECTRIC LOADS

(75) Inventor: Natale Aiello, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/575,332

(22) Filed: May 19, 2000

(30) Foreign Application Priority Data

May 21, 1999 (IT) .......................... MI99A1131

(51) Int. Cl.[7] .............................. G05F 11/00
(52) U.S. Cl. .................. 315/291; 315/209 R; 315/224; 363/132
(58) Field of Search ................. 315/291, 224, 315/209 R, 219, 276, 274, 307, 294, 225, 282, 354; 363/98, 132, 37

(56) References Cited

U.S. PATENT DOCUMENTS 5,303,140 A * 4/1994 Shimizu ............... 363/132
5,500,792 A * 3/1996 Jeon et al. ............. 363/98
5,740,021 A * 4/1998 Lecheler et al. ........ 363/37
5,828,188 A * 10/1998 Lechelelr .............. 315/309
6,072,710 A * 6/2000 Chang ................ 363/132

* cited by examiner

Primary Examiner—Don Wong
Assistant Examiner—Tuyet T. Vo
(74) Attorney, Agent, or Firm—Lisa Jorgensen; Robert Iannucci; Seed IP Law Group, PLLC (57) ABSTRACT

A drive architecture for electric loads, and in particular for loads of light sources is presented. The architecture includes first and second drive circuit blocks connected in series with each other into a half-bridge configuration between first and second terminals of a rectified electric power supply network for the light source. Each drive circuit block has a respective secondary winding of a transformer associated therewith and includes at least a power device and a control circuit portion for controlling the power device. Each control circuit portion of each drive circuit block is subjected to a trigger action directly by its associated secondary winding to generate a high-frequency AC current for driving the light source.

18 Claims, 6 Drawing Sheets

VARIABLE FREQUENCY SELF-OSCILLATING HALF-BRIDGE DRIVE ARCHITECTURE PARTICULARLY FOR ELECTRIC LOADS

TECHNICAL FIELD

This invention relates to a variable frequency self-oscillating half-bridge drive architecture, and, more particularly to a drive architecture for electric loads, such as light sources and the like, that include first and second drive circuit blocks connected in series with each other into a half-bridge configuration between first and second terminals of a rectified power supply network for the light source.

BACKGROUND OF THE INVENTION

A halogen lamp or fluorescent lamp can be driven by an electronic circuit capable of generating signals at a very high frequency compared to the frequency of the power supply network. In particular, frequencies in the 30 to 50 kHz range can be generated compared to the 50–60 Hz of the power supply network.

In this way, the quality of the emitted light and the efficiency of the emitting source can be improved substantially.

This amplified frequency is usually obtained by interposing, between the power supply network and the light emitting source or lamp, a circuit effective to perform a first conversion from AC voltage [50/60 Hz] to essentially DC voltage, with only a limited oscillation or ripple. A subsequent conversion from DC voltage to AC voltage brings the signal up to a higher frequency [30–50 kHz], as shown schematically in FIG. 1.

Figure 1:
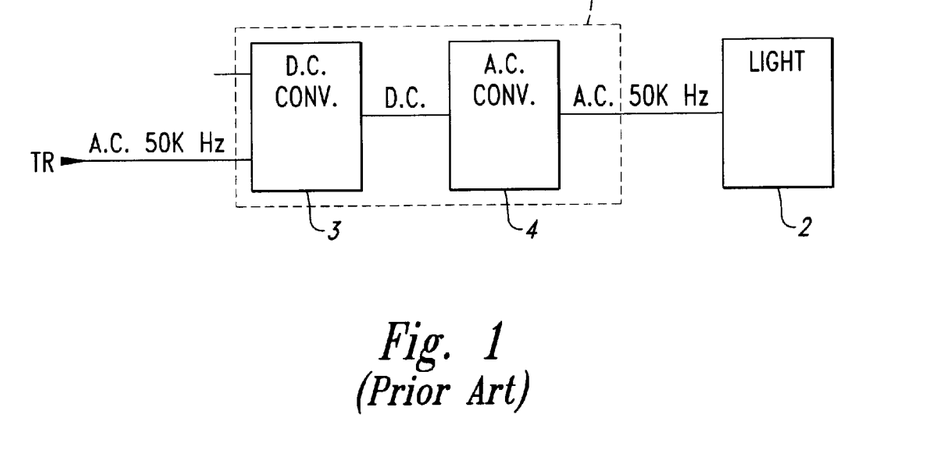
FIG. 1 is a schematic diagram of the general layout of a voltage conversion arrangement according to the prior art.

In particular, FIG. 1 shows a drive circuit 1 which comprises first 3 and second 4 stages cascade connected with each other between a supply network terminal TR and a light source 2.

The AC voltage is rectified and filtered through the first stage 3 to produce a DC voltage which is input to the second stage 4 for conversion to a suitable high-frequency AC voltage for driving the source 2.

In actual practice, there exist several ways of obtaining this conversion from low-frequency to high-frequency AC voltage. In general, two switches SW1 and SW2 are used, suitably driven and connected into a half-bridge configuration, and will be discussed with reference to FIGS. 2A–2D.

More particularly, the switches SW1 and SW2 are connected in series with each other between the terminals T1' and T2' of the rectified supply network, which terminals are connected together by a series of a first C' and a second C" capacitor. The second terminal T2' of the rectified supply network is connected to a voltage reference, such as a signal ground GND.

The halogen or fluorescent source 2 is placed between a first interconnection node of the switches SW1, SW2 and a second interconnection node of the capacitors C', C", it being connected in series with a winding or the primary winding of a transformer 4.

Lately the trend among manufacturers of halogen or fluorescent apparatus has been toward increasingly smaller and low-cost designs. Accordingly, a primary concern has become the design of circuits which can be driven using a minimum of components, while being reliable and inexpensive.

In this framing, different design circuits are currently available for driving such apparatus, as shown schematically in FIGS. 2A to 2D.

Figure 2A:
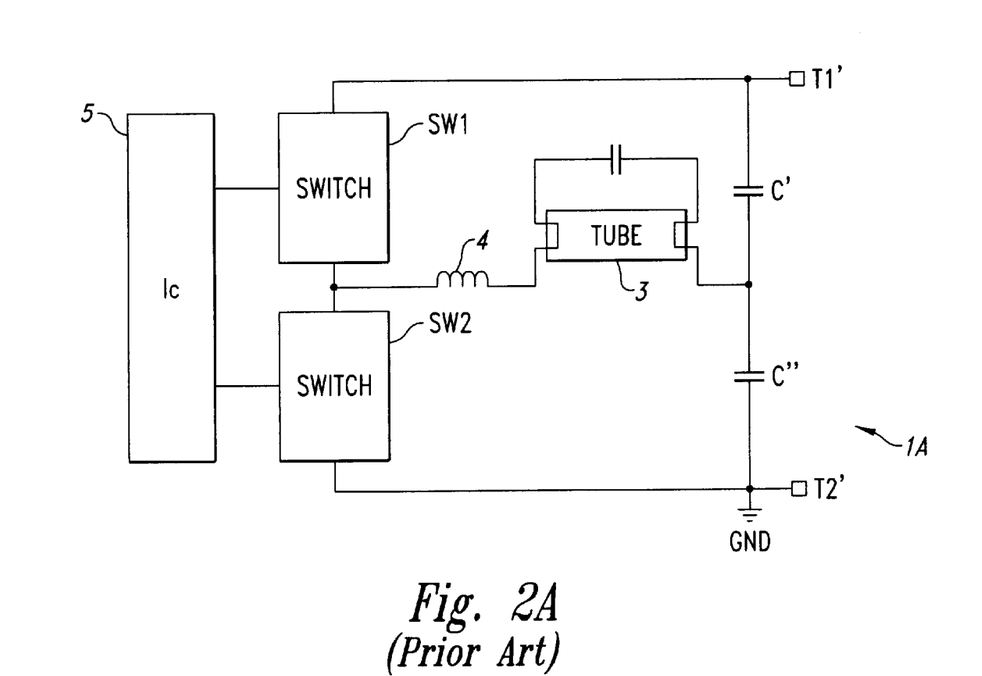
FIGS. 2A to 2D show examples of conventional drive architectures for halogen or fluorescent sources.

FIG. 2A shows a conventional drive architecture 1A which comprises an integrated circuit 5 arranged to drive both switches SW1 and SW2 directly.

This prior architecture is quite effective to minimize the number of on-board components, but is highly expensive on account of the high cost of the integrated circuit, and disallows feedback between the working state of the lamp and an oscillator contained in the integrated circuit 5; the oscillator operates, therefore, at a fixed frequency regardless of the operating phase of the light source 3.

Figure 2B:
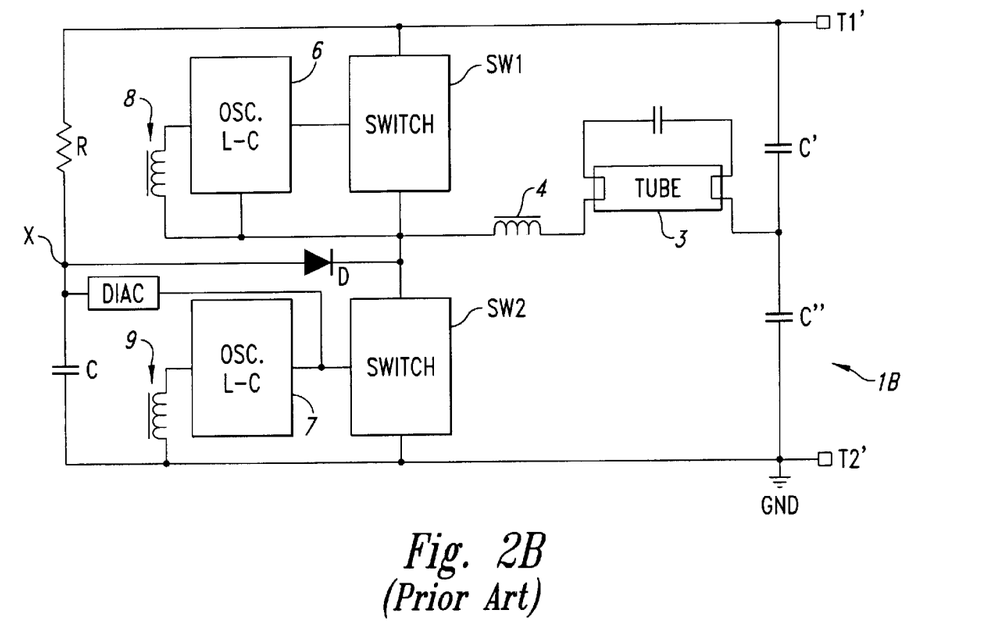

A second conventional design is shown schematically in FIG. 2B, wherein a drive architecture 1B drives the switches SW1 and SW2 with the intermediary of two L-C oscillators 6 and 7 which are connected in parallel with the switches SW1, SW2 and triggered by first 8 and second 9 secondary windings wound around the same core of transformer 4.

The drive architecture 1B includes a DIAC circuit connected to the input of the second switch SW2, and an internal circuit node X which is formed between a resistor R and a capacitor C connected in series with each other between the terminals T1' and T2'of the rectified supply network.

The drive architecture 1B also includes a diode D, connected between the node X and the intermediate node of the switches SW1 and SW2.

It should be noted that the DIAC circuit and diode D are only useful at startup of the drive architecture because, afterwards, the oscillations of the oscillators 6, 7 support themselves automatically.

Figure 2C:
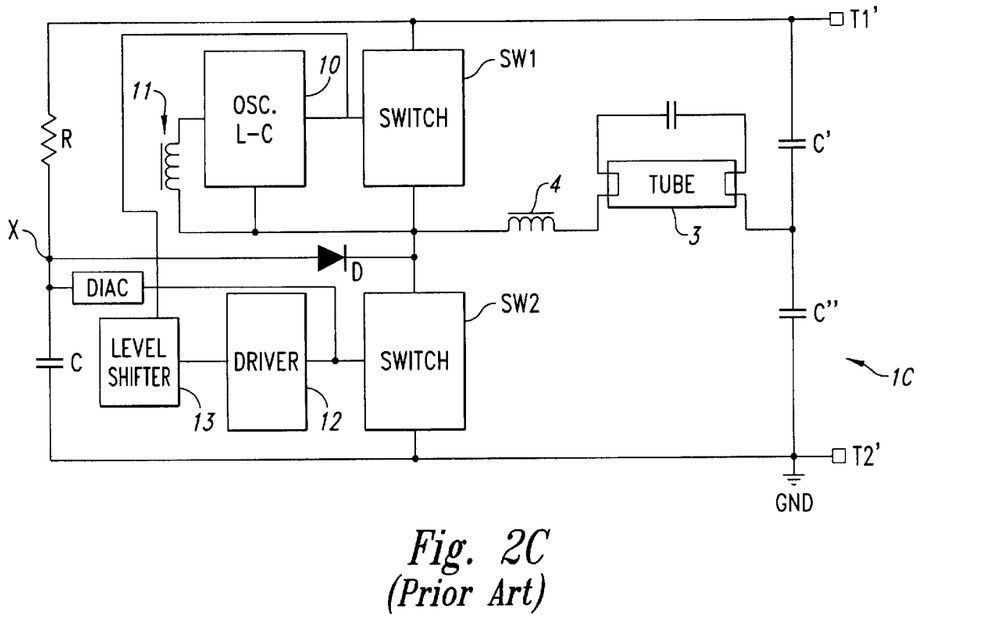

A prior art modification of the drive architecture 1B is shown in FIG. 2C, generally at 1C in schematic form, and comprises a single oscillator 10 having a respective trigger secondary winding 11. The drive architecture 1C further comprises a driver block 12 connected to the second terminal T2' of the rectified supply network, and connected to the second switch SW2 directly and the first switch SW1 via a voltage shifter 13.

Figure 2D:
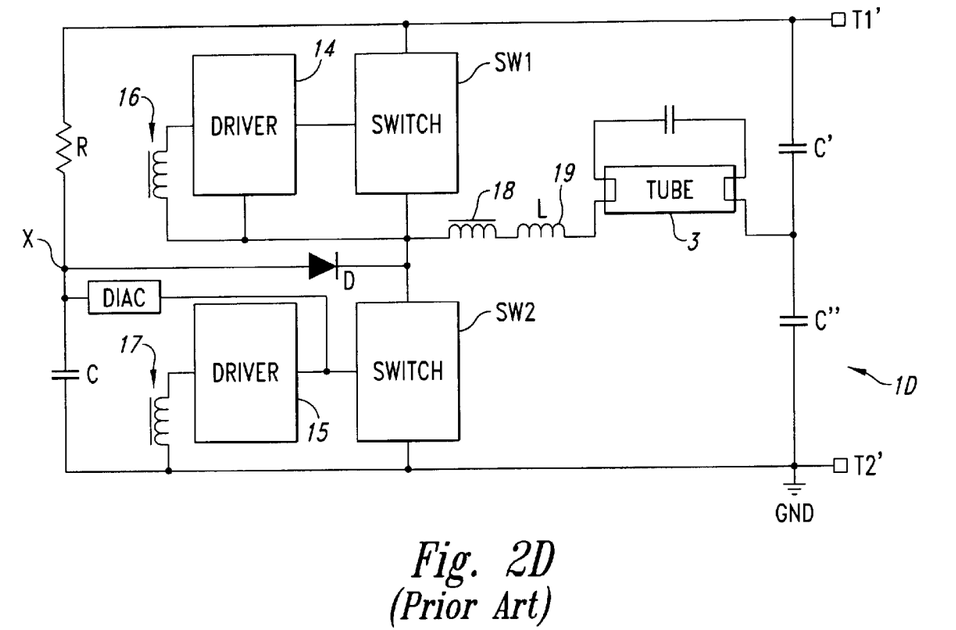

FIG. 2D shows another state-of-art drive architecture 1D which is widely used because of its low cost. The drive architecture 1D comprises first 14 and second 15 drive circuits connected to the inputs of the switches SW1, SW2 and triggered by first 16 and second 17 secondary windings which are connected to a saturated-core transformer 18, itself connected to the light source 3 by a winding 19.

The frequency of oscillation of the drive architecture 1D is set by the saturated-core transformer 18, which is incapable, however, of ensuring ready repeatability of its characteristics. To achieve stable operation of this transformer, its ferrite components must be carefully selected.

In general, working frequencies are obtained, however, which differ between devices, resulting in the lamp being supplied different power levels.

There has yet to be developed a drive architecture that has adequate structural and functional features to overcome the drawbacks of conventional architectures.

SUMMARY OF THE INVENTION

Embodiments of this invention have an oscillation generated within the drive architecture using a trigger winding, rather than by a true oscillator.

Presented, therefore, is a drive architecture for electric loads, in particular light sources and the like, that includes first and second drive circuit blocks connected in series with each other into a half-bridge configuration between first and second terminals of a rectified electric power supply network. Each drive circuit block has a respective secondary winding of a transformer associated therewith, and each drive circuit block includes at least a power device and a control circuit portion for controlling the power device. In each control circuit portion of each drive is a circuit block being subjected to a trigger action directly by its associated secondary winding to generate a high-frequency AC current for driving the light source.

The features and advantages of the architecture according to embodiments of the invention will be apparent from the following description of one of the embodiments thereof, given by way of non-limitative example with reference to the accompanying drawings. Although this description covers an architecture adapted to drive light sources, e.g. halogen or fluorescent lamps the invention is not limited to this exclusively, and the description covers this field only for convenience of illustration.

DETAILED DESCRIPTION

Figure 3:
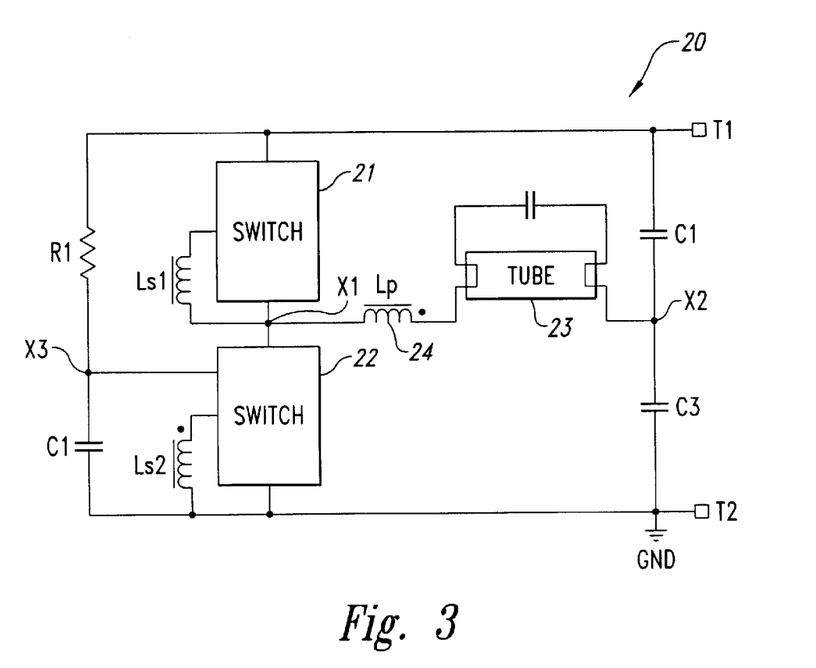
FIG. 3 is a schematic diagram of a drive architecture according to an embodiment of the invention.

Referring in particular to FIG. 3 of the drawings, a drive architecture according to an embodiment of the invention is generally shown at 20 in diagramatic form. This architecture 20 is intended, particularly but not exclusively, for driving light sources, such as halogen lamps, fluorescent lamps, and the like.

The drive architecture 20 includes first 21 and second 22 circuit blocks which are connected in series with each other between first T1 and second T2 terminals of a rectified power supply network. These terminals T1, T2 are also connected together by a series of a resistor R1 and a first capacitor C1, upstream of the circuit blocks 21, 22, and by of a series of second C2 and third C3 capacitors, downstream of the blocks 21, 22. The second terminal T2 is connected to a voltage reference, e.g., a signal ground GND.

A series of a light source 23 and a transformer 24 are connected between a first intermediate circuit node X1, between the blocks 21, 22, and a second intermediate circuit node X2, between the capacitors C2, C3.

Advantageously in this embodiment, the circuit blocks 21 and 22 are triggered by first Ls1 and second Ls2 secondary windings wound around the same core or primary winding Lp of the transformer 24. Furthermore, a third circuit node X3, between the resistor R1 and the first capacitor C1, is connected to the second circuit block 22.

The series of the second capacitor C2, inherent capacitance of the light source 23, and primary winding Lp form a resonant series portion within the drive architecture 20.

Figure 4:
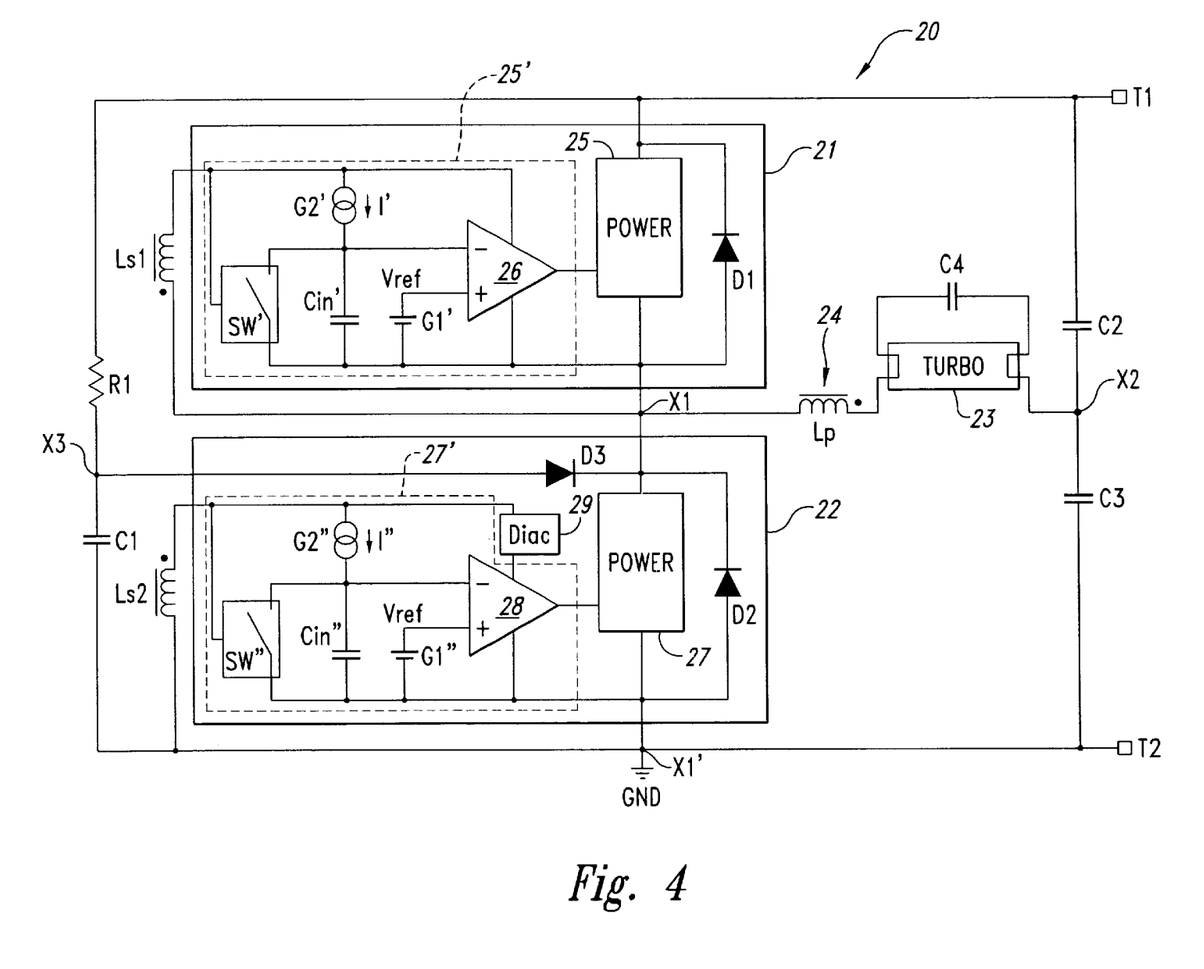
FIG. 4 is a detailed schematic view of the drive architecture of FIG. 3, as used for driving a fluorescent lamp.

Specifically, with reference to FIG. 4, the circuit block 21 comprises a power device 25 which is connected between the first terminal T1 of the rectified supply network and the first intermediate circuit node X1 and has an input connected to an output terminal of a control circuit portion 25', itself connected to one end of the first secondary winding Ls1 and the first circuit node X1.

This control circuit portion 25', in particular, comprises an operational amplifier 26 which is connected between one end of the first secondary winding Ls1 and the first intermediate circuit node X1 and has an output terminal connected to the input of the power device 25.

The operational amplifier 26 also has an inverting input terminal and a noninverting input terminal which are connected to the node X1 respectively through a capacitor Cin' and a generator G1' of a voltage reference Vref', and has a drive terminal connected to one end of the first secondary winding Ls1, in turn connected with the other end to the first node X1.

The control circuit portion 25' further comprises a second generator G2' of a current I' which is connected between the drive terminal and the inverting input terminal of the operational amplifier 26.

Advantageously in this embodiment, the control circuit portion 25' also includes a switch SW', connected across the capacitor Cin' and controlled by a voltage presented at one end of the first secondary winding Ls1.

Finally, the first circuit block 21 includes a diode D1 connected, in parallel with the power device 25, between the first terminal T1 of the rectified supply network and the first intermediate circuit node X1.

The circuit block 22 likewise comprises a power device 27 which is connected between the first intermediate circuit node X1 and a further reference circuit node X1' being coincident with the second rectified supply network terminal T2 and having an input connected to an output terminal of a control circuit portion 27', itself connected to one end of the second secondary winding Ls2 and the second terminal T2.

This control circuit portion 27', in particular, comprises an operational amplifier 28 which is connected between one end of the second secondary winding Ls2 and the second terminal T2 and has an output terminal connected to the input of the power device 27.

The operational amplifier 28 also has an inverting input terminal and a noninverting input terminal which are connected to the second terminal T2 respectively through a capacitor Cin" and a generator G1" of a voltage reference Vref"', and has a drive terminal connected to one end of the second secondary winding Ls2, in turn connected with the other end to the second terminal T2.

The control circuit portion 27' further comprises a second generator G2" of a current I" which is connected between the drive terminal and the inverting input terminal of the operational amplifier 28.

Advantageously in this embodiment invention, the control circuit portion 27' also includes a switch SW", connected across the capacitor Cin" and controlled by a voltage presented at one end of the second secondary winding Ls2.

Finally, the second circuit block 22 includes a diode D2 connected, in parallel with the power device 27, between the first intermediate circuit node X1 and the second terminal T2 of the rectified supply network.

Advantageously in this embodiment invention, the circuit block 22 fer includes a DIAC device 29 connected between the third intermediate circuit node X3 and the output terminal of the operational amplifier 28, and includes a diode D3 connected between the third intermediate circuit node X3 and the first X1.

In a preferred embodiment, the values of the capacitors Cin' and Cin", the values of the reference voltages Vref' and Vref", and the values of the currents I' and I" are chosen to be the same, i.e.:

$$Cin'=Cin"=C$$

$$Vref'=Vref"=Vref$$

$$I'=I"=I$$

The operation of the drive architecture according to the described embodiment for driving a light source in a halogen or fluorescent apparatus will now be described. It is important to observe that, whereas prior solutions used different circuit designs for fixing the working frequency of the halogen or fluorescent apparatus, the drive architecture of this circuit uses no true oscillator, but obtains oscillation from a circuit capable of establishing the "off" point in time of the apparatus upon receiving an "on" signal through the secondary winding of the transformer.

At the start-up of the drive architecture 20, the rectified supply network voltage is presented at the first terminal T1, the second terminal T2 being connected to ground GND. Current begins to flow through the resistor R1 and charges the capacitor C1; upon the voltage across this capacitor C1 reaching the trigger threshold of the DIAC device of the circuit block 22, the power device 27 contained in said circuit block 22 is turned on.

Thus, a current is caused to flow to ground from the terminal T1, along a path which includes the capacitor C2, source 23, transformer 24, and power device 27.

Advantageously, the secondary windings Ls1 and Ls2 are wound to respectively apply negative and positive voltages to the control circuit portions 25' and 27'.

In particular, the positive voltage from the winding Ls2, besides acknowledging the "on" state of the corresponding power device 27, also activates the generator G2" of the current I" to charge the capacitor Cin", having the same capacitance as C. When the voltage across the capacitor Cin" equals the value of the voltage Vref, the power device 27 is turned off by the operational amplifier 28, and the current present in the circuit block 22 will continue flowing through the diode D1 of the circuit block 21 until exhausted.

During this phase, the voltage at the secondary windings Ls1 and Ls2 is inverted to become positive at Ls1 and negative at Ls2, thus allowing the charge built up within the capacitor Cin" of the circuit block 22 to be discharged, and initiating the same process as previously described for the circuit block 21.

The capacitor Cin" will be discharged through the switch SW". This switch SW", being connected in parallel with the capacitor Cin", is controlled directly by its connection to one end of the second secondary winding Ls2, and in particular, is turned on by the voltage at the secondary winding Ls2 becoming negative.

Advantageously, the blocks 21 and 22 are push-pull driven from the secondary windings Ls1 and Ls2, so that simultaneous conduction of the two blocks is prevented.

The working frequency of the drive architecture 20 of this embodiment is, therefore, set by the values of the capacitor C, the current I, and the reference voltage Vref, which are all internal parameters of the blocks 21 and 22.

A major advantage of this drive architecture is that it does not constrain the system working frequency when the latter is higher than that set by the blocks 21 and 22. In this case, the working frequency of the whole apparatus is the frequency established by the series resonant portion of the drive circuit 20 comprising the capacitor C2, an additional capacitor C4 connected in parallel with the source 23, and the primary winding Lp.

This is what takes place in the apparatus at start-up, and with the source comprising essentially a fluorescent lamp, as shown in FIG. 4, connected in series with the primary winding Lp and having an additional capacitor C4.

When turned on, a fluorescent lamp has the character of a series circuit, and the working frequency is dependent on the values of the capacitors C2, C4 and the primary winding Lp. Thereafter, the fluorescent lamp may be regarded as the equivalent of a resistor forming the series resonant portion in combination with the capacitor C2 and the primary winding Lp.

Thus, an elevated frequency (on the order of 70 kHz), above the working frequency set by the blocks 21, 22 for normal operation, is obtained at start-up.

Advantageously, the drive circuit 20 provides, therefore, an adaptative type oscillating system, having its trigger frequency set by the system itself automatically changing the value of the working frequency at the end of the turn-on phase.

Figure 5:
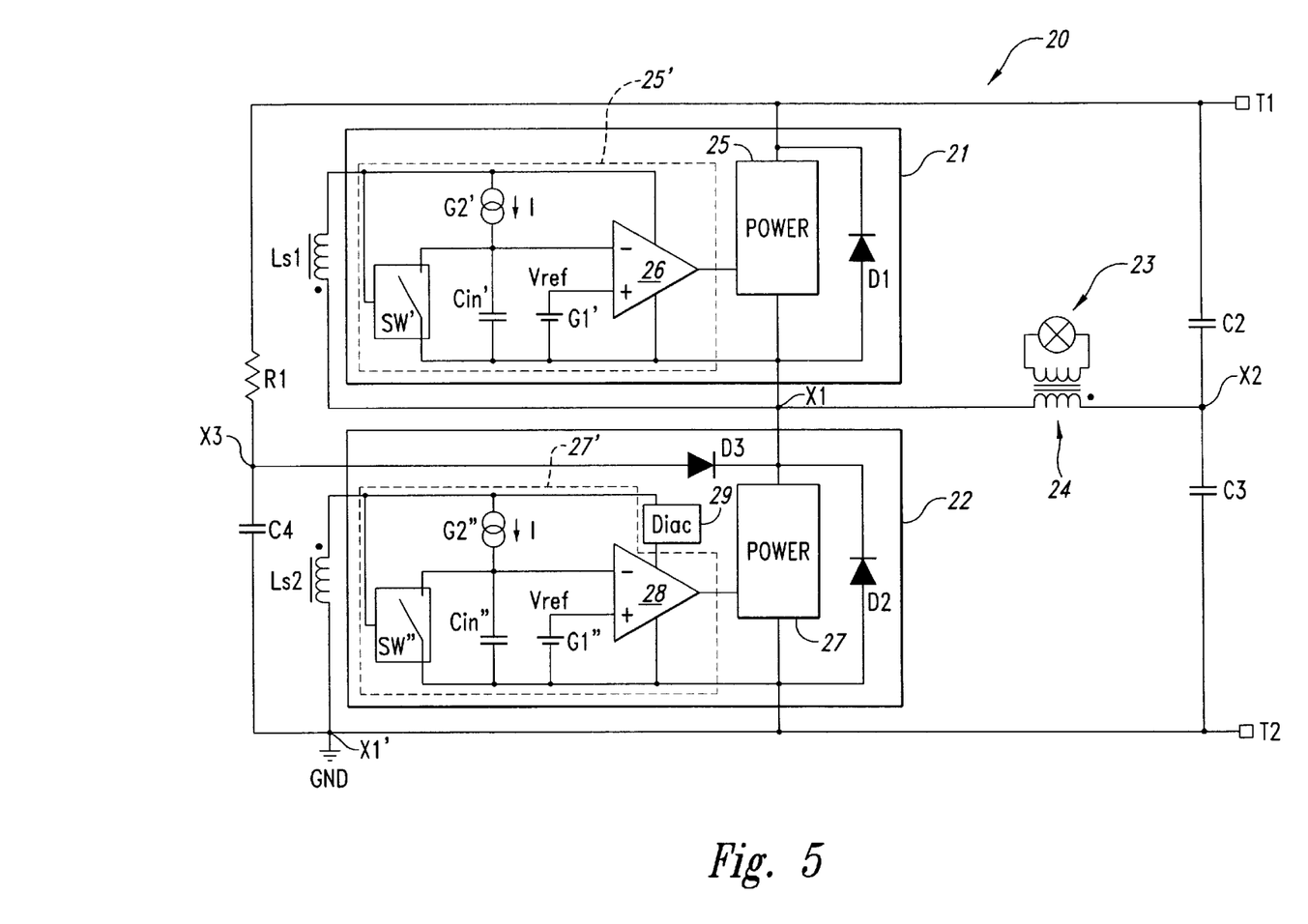
FIG. 5 is a detail schematic view of the drive architecture of FIG. 3, as used for driving a halogen lamp.

When, on the other hand, the source 23 comprises a halogen lamp, as shown in FIG. 5, the drive circuit should be designed for a low-voltage supply to the lamp. For this purpose, the halogen lamp is to be related to a third secondary winding of the transformer 24.

Figure 6:
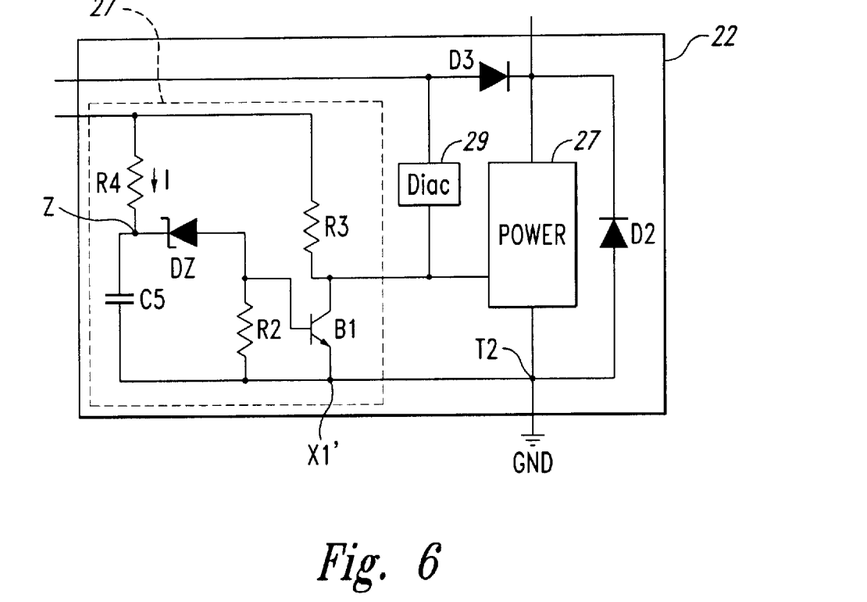
FIG. 6 shows a detail of the drive architectures of either FIG. 4 or 5.

Shown in FIG. 6 is another possible embodiment of the control circuit portion 27' of the block 22, which includes a bipolar transistor B1 having its collector terminal connected to the input of the power device 27, and having its emitter terminal and base terminal connected to the second terminal T2 of the rectified network directly and through a first resistor R2, respectively.

The control circuit portion 27' further includes a second resistor R3 connected between one end of the secondary winding Ls2 and the collector terminal of the bipolar transistor B1, and has a series of a third resistor R4 and a capacitor C5 connected across the secondary winding Ls2 and defining an intermediate circuit node Z, in turn connected to the base of the bipolar transistor B11 through a Zener diode DZ.

In addition, the block 22 may be an emitter-switching configuration, so as to allow the amount of charge stored in the block 22 to be recovered.

In this way, a more accurate drive circuit can be obtained, since a supply reference would be used which is relatively stable and the apparatus as a whole is unconstrained by voltage variations in the secondary winding while generating the charge current to the capacitor C5.

Figure 7:
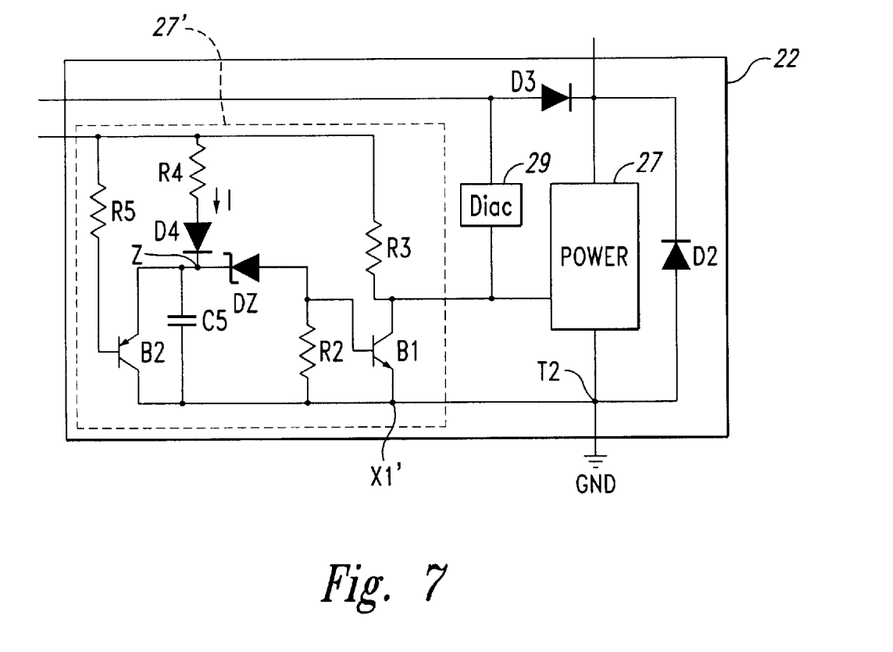
FIG. 7 shows another embodiment of the detail represented in FIG. 6.

FIG. 7 shows a preferred embodiment of the control circuit portion 27' which comprises a further switching block B2 connected in parallel across the capacitor C5 and, via a resistor R5, to one end of the secondary winding Ls2 for discharging the capacitor C5.

Advantageously, a decoupling diode D4 is connected in series with the resistor R4 to force the capacitor C5 to discharge through the switching block B2. Thus, the initial charge conditions of the capacitor C5 are set at the end of each charge/discharge cycle independently of the drive provided by the secondary winding Ls2.

To summarize, this drive architecture can be implemented using discrete components, in combination with a smart-power technology, to provide the advantages of improved reliability, guaranteed repeatable performance, as well as reduced cost from fewer components.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A drive architecture for an electric load comprising:

first and second drive circuit blocks connected in series with each other into a half-bridge configuration between first and second terminals of a rectified electric power supply network for said electric load, each drive circuit block having a respective secondary winding of a transformer associated therewith, and each drive circuit block including at least a power device and a control circuit portion for controlling the power device, each control circuit portion of each drive circuit block being subjected to a trigger action directly by its associated secondary winding during oscillation of the half-bridge to generate a high-frequency AC current for driving said electric load.

2. The drive architecture according to claim 1 wherein said drive circuit blocks include respective diodes connected in parallel with said power devices.

3. A drive architecture for an electric load comprising:

first and second drive circuit blocks connected in series with each other into a half-bridge configuration between first and second terminals of a rectified electric power supply network for said electric load, each drive circuit block having a respective secondary winding of a transformer associated therewith, and each drive circuit block including at least a power device and a control circuit portion for controlling the power device, each control circuit portion of each drive circuit block being subjected to a trigger action directly by its associated secondary winding to generate a high-frequency AC current for driving said electric load, said control circuit portions comprising:

respective operational amplifiers which are connected between one end of the secondary inductors and respective circuit nodes, respective output terminals connected to inputs of the power devices; and respective drive terminals connected to one end of the secondary windings.

4. The drive architecture according to claim 3 wherein said control circuit portions comprise:

respective capacitors connected between first input terminals of the operational amplifiers and said circuit nodes; and respective reference voltage generators connected to second input terminals of the operational amplifiers and said circuit nodes.

5. The drive architecture according to claim 3 wherein at least one of said drive circuit blocks further comprises a trigger device connected between said circuit node and an output terminal of the operational amplifier.

6. The drive architecture according to claim 3 wherein said control circuit portions further comprise respective current generators connected between said drive terminals and the first input terminals of the operational amplifiers.

7. The drive architecture according to claim 6 wherein said control circuit portions comprise respective switches connected across said capacitors and controlled by a voltage presented at said end of the secondary windings.

8. A drive architecture for an electric load comprising:

first and second drive circuit blocks connected in series with each other into a half-bridge configuration between first and second terminals of a rectified electric power supply network for said electric load, each drive circuit block having a respective secondary winding of a transformer associated therewith, and each drive circuit block including at least a power device and a control circuit portion for controlling the power device, each control circuit portion of each drive circuit block being subjected to a trigger action directly by its associated secondary winding to generate a high-frequency AC current for driving said electric load, wherein at least one of said control circuit portions comprises:

a bipolar transistor having a collector terminal connected to the input of the power device, an emitter terminal connected to the one of the terminals of the power supply network, and a base terminal connected to said one of the terminals of the power supply network through a first resistive element;

a second resistive element connected between one end of the secondary winding and the collector terminal of the bipolar transistor; and a series of a third resistive element and a capacitor connected across the secondary winding.

9. The drive architecture according to claim 8 wherein said at least one control circuit portion further comprises a Zener diode connected between a further intermediate circuit node, defined between the third resistive element and the capacitor, and the base of the bipolar transistor.

10. The drive architecture according to claim 9 wherein said at least one control circuit portion further comprises a switching block parallel connected across the capacitor and connected, through a fourth resistive element, to said end of the secondary winding and adapted to discharge said capacitor.

11. The drive architecture according to claim 10 wherein said at least one control circuit portion further comprises a decoupling diode connected in series with the third resistive element to force discharging of said capacitor through said driving circuit block.

12. A method of driving an electric load coupled between a first junction of a first and second half-bridge drive units and a second junction of a first and a second supply terminals, comprising:

generating a first signal at a first secondary winding of a transformer;

turning on a first power transistor coupled between the first supply terminal and the first junction;

charging a first capacitor using the first signal;

comparing a voltage of the first capacitor to a first reference voltage;

turning off the first power transistor when the voltage of the first capacitor reaches the first reference voltage;

generating a second signal at the first secondary winding of the transformer; and discharging the first capacitor when the second signal is generated.

13. The method of claim 12 further comprising:

generating a third signal at a second secondary winding of the transformer;

turning on a second power transistor coupled between the second supply terminal and the first junction;

charging a second capacitor using the third signal;

comparing a voltage of the second capacitor to a second reference voltage;

turning off the second power transistor when the voltage of the second capacitor reaches the second reference voltage;

generating a fourth signal at the second secondary winding of the transformer; and discharging the second capacitor when the fourth signal is generated.

14. The method of claim 12 wherein charging a first capacitor using the first signal comprises coupling the first signal to a current generator coupled to a first terminal of the first capacitor.

15. The method of claim 12 further comprising beginning to discharge any current present in the first half-bridge drive unit after turning off the first power transistor and before generating a second signal at the first secondary winding.

16. The method of claim 12 wherein the electric load is a halogen lamp.

17. The method of claim 12 wherein discharging the first capacitor when the second signal is generated comprises closing a switch coupled between a first and a second terminal of the first capacitor.

18. The method of claim 17 wherein closing the switch comprises tuning on a transistor having a control terminal adapted to receive the second signal, and first and second conduction terminals coupled to the first and second terminals of the first capacitor.

* * * * *